(12) United States Patent
Hoshihara et al.

(10) Patent No.: US 10,556,521 B2
(45) Date of Patent: Feb. 11, 2020

(54) SEAT SLIDING DEVICE FOR VEHICLE

(71) Applicant: AISIN SEIKI KABUSHIKI KAISHA, Kariya-shi (JP)

(72) Inventors: Naoaki Hoshihara, Obu (JP); Yasuhiro Kojima, Kariya (JP); Katsuya Nozue, Toyohashi (JP); Takanori Sato, Kasugai (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days.

(21) Appl. No.: 15/750,243

(22) PCT Filed: Jul. 22, 2016

(86) PCT No.: PCT/JP2016/071606
§ 371 (c)(1),
(2) Date: Feb. 5, 2018

(87) PCT Pub. No.: WO2017/022530
PCT Pub. Date: Feb. 9, 2017

(65) Prior Publication Data
US 2018/0222354 A1 Aug. 9, 2018

(30) Foreign Application Priority Data
Aug. 6, 2015 (JP) ................................. 2015-156508

(51) Int. Cl.
*B60N 2/08* (2006.01)
*B60N 2/427* (2006.01)
*B60N 2/07* (2006.01)

(52) U.S. Cl.
CPC ........... *B60N 2/085* (2013.01); *B60N 2/0705* (2013.01); *B60N 2/0715* (2013.01);
(Continued)

(58) Field of Classification Search
CPC ...... B60N 2/0818; B60N 2/0705; B60N 2/08; B60N 2/42709; B60N 2/0875; B60N 2/0881; B60N 2/0727; B60N 2/085
(Continued)

(56) References Cited

U.S. PATENT DOCUMENTS 3,631,740 A * 1/1972 Gavagan .............. B60N 2/0705
248/430
5,219,202 A * 6/1993 Rink ................... B60N 2/42709
297/216.13
(Continued)

FOREIGN PATENT DOCUMENTS

JP 2009-40185 A 2/2009
JP 2010-52528 A 3/2010
(Continued)

OTHER PUBLICATIONS

International Search Report dated Sep. 27, 2016, in PCT/JP2016/071606 filed Jul. 22, 2016.
(Continued)

*Primary Examiner* — Jonathan Liu
*Assistant Examiner* — Taylor L Morris
(74) *Attorney, Agent, or Firm* — Oblon, McClelland, Maier & Neustadt, L.L.P.

(57) ABSTRACT

A shaft housing hole has a shaft insertion hole into which the rotating shaft section of an engagement member is inserted. Also, the shaft housing hole has slits extending from the lower end of the shaft insertion hole along the side surface of the shaft insertion hole toward an upper connection wall section. The upper side wall section of an upper rail has shaft restriction sections formed by the shaft housing hole. The shaft restriction sections have front ends with which the side surfaces of the rotating shaft section are in contact.

2 Claims, 6 Drawing Sheets

(52) U.S. Cl.
CPC ......... *B60N 2/0818* (2013.01); *B60N 2/0875* (2013.01); *B60N 2/0881* (2013.01); *B60N 2/42709* (2013.01); *B60N 2/0722* (2013.01); *B60N 2/0727* (2013.01)

(58) Field of Classification Search
USPC ................. 248/344.1, 424, 429, 460, 548
See application file for complete search history.

(56) References Cited

U.S. PATENT DOCUMENTS

| | | | | |
|---|---|---|---|---|
| 6,286,799 | B1* | 9/2001 | Fujii | B60N 2/071 |
| | | | | 248/430 |
| 6,761,407 | B1* | 7/2004 | Goodbred | B60N 2/0715 |
| | | | | 297/344.1 |
| 6,902,235 | B2* | 6/2005 | Rohee | B60N 2/08 |
| | | | | 248/424 |
| 7,000,880 | B2* | 2/2006 | Jaudouin | B60N 2/08 |
| | | | | 248/429 |
| 7,070,236 | B2* | 7/2006 | Kawashima | B60N 2/4228 |
| | | | | 297/216.1 |
| 7,229,117 | B2* | 6/2007 | Okuda | B60N 2/0818 |
| | | | | 296/64 |
| 7,854,477 | B2* | 12/2010 | Axelsson | B60N 2/4228 |
| | | | | 297/216.1 |
| 8,052,195 | B2* | 11/2011 | Aufrere | B60N 2/015 |
| | | | | 188/376 |
| 8,469,328 | B2* | 6/2013 | Nakamura | B60N 2/0705 |
| | | | | 248/424 |
| 9,783,084 | B2* | 10/2017 | Kumagai | B60N 2/0705 |
| 9,855,867 | B2* | 1/2018 | Satoh | B60N 2/0837 |
| 2004/0108762 | A1* | 6/2004 | Borbe | B60N 2/0705 |
| | | | | 297/344.11 |
| 2006/0214477 | A1 | 9/2006 | Fukada et al. | |
| 2007/0052273 | A1 | 3/2007 | Satta et al. | |
| 2012/0153696 | A1* | 6/2012 | Garotte | B60N 2/0881 |
| | | | | 297/344.1 |
| 2012/0205512 | A1 | 8/2012 | Fujishiro et al. | |
| 2013/0214112 | A1* | 8/2013 | Kawamura | B60N 2/08 |
| | | | | 248/429 |
| 2014/0110553 | A1* | 4/2014 | Hoshihara | B60N 2/06 |
| | | | | 248/429 |
| 2016/0221476 | A1* | 8/2016 | Satoh | B60N 2/0705 |
| 2016/0221477 | A1* | 8/2016 | Satoh | B60N 2/0837 |
| 2017/0036566 | A1* | 2/2017 | Sato | B60N 2/0705 |
| 2017/0036567 | A1* | 2/2017 | Sato | B60N 2/0705 |
| 2017/0036568 | A1* | 2/2017 | Kumagai | B60N 2/0705 |
| 2017/0036569 | A1* | 2/2017 | Sato | B60N 2/0705 |
| 2018/0222354 | A1* | 8/2018 | Hoshihara | B60N 2/0818 |

FOREIGN PATENT DOCUMENTS

| | | |
|---|---|---|
| JP | 2011-98610 A | 5/2011 |
| JP | 2014-34330 A | 2/2014 |
| JP | 2015-27841 A | 2/2015 |

OTHER PUBLICATIONS

International Preliminary Report on Patentability and Written Opinion dated Sep. 27, 2016 in PCT/JP2016/071606 (submitting English translation only).

\* cited by examiner

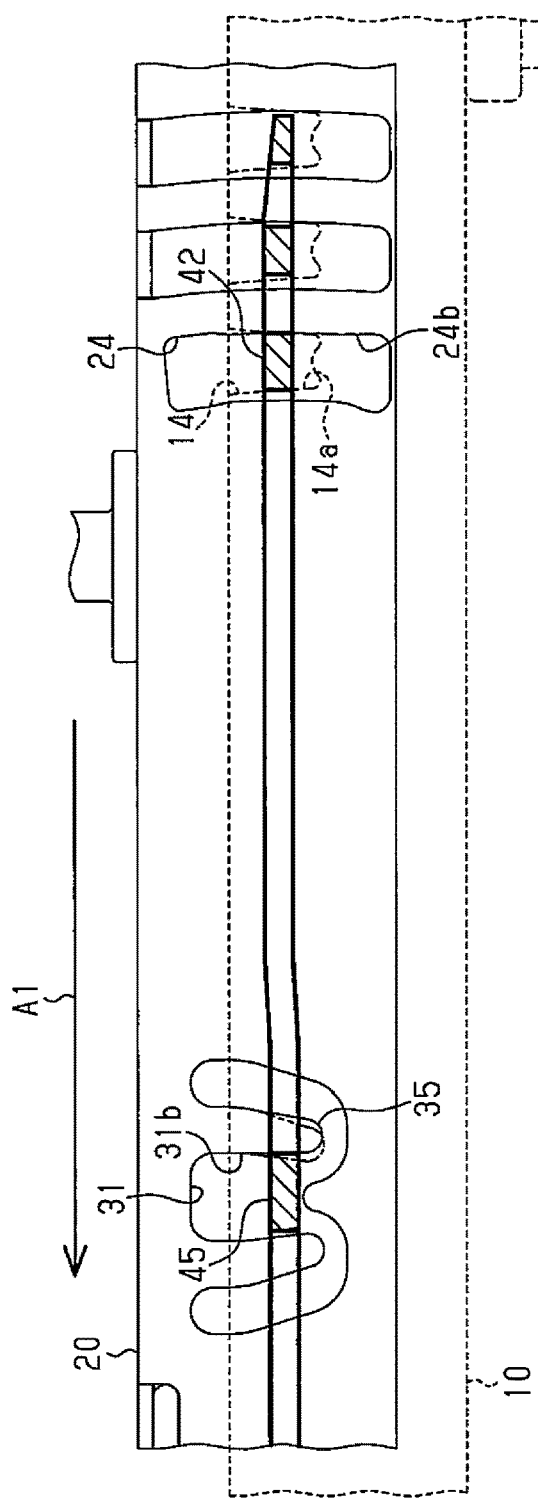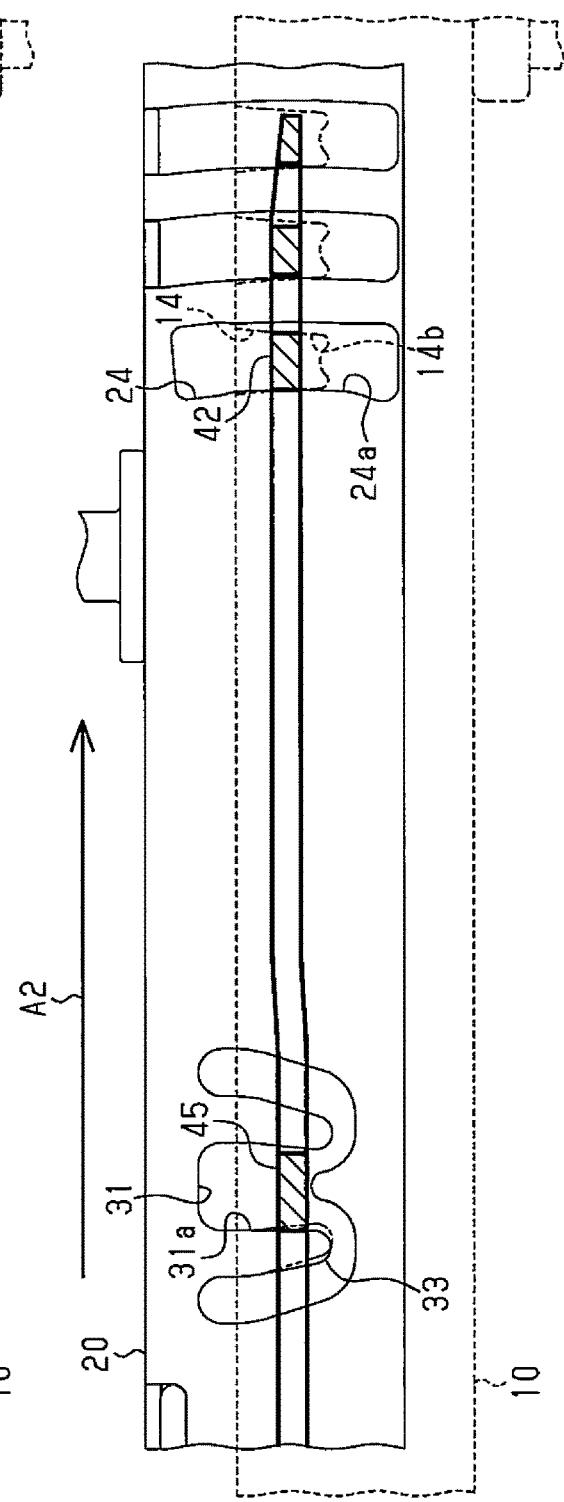

SEAT SLIDING DEVICE FOR VEHICLE

TECHNICAL FIELD

The present invention relates to a vehicle seat sliding device.

BACKGROUND ART

A vehicle seat sliding device allows a seat to move in a front-rear direction. The vehicle seat sliding device includes a lower rail coupled to a vehicle body, an upper rail coupled to the seat, and a lock member. The lower rail supports the upper rail so that the upper rail is movable in a longitudinal direction of the lower rail. The lock member restricts movement of the upper rail relative to the lower rail (for example, refer to patent document 1). A vehicle seat sliding device needs to stabilize the position of the lock member.

PRIOR ART DOCUMENT

Patent Document
Patent Document 1: Japanese Laid-Open Patent Publication No. 2011-98610

SUMMARY OF THE INVENTION

Problems that are to be Solved by the Invention

It is an object of the present invention to provide a vehicle seat sliding device capable of stabilizing the position of a lock member.

Means for Solving the Problem

To solve the above problem, a first aspect of the present invention provides a vehicle seat sliding device that includes a first rail, a second rail coupled to the first rail to be movable in a longitudinal direction of the first rail, and a lock member pivotally arranged in the second rail. The lock member includes a body, a rotation shaft extending from the body in a width-wise direction, which is orthogonal to the longitudinal direction, and a lock hook extending from a distal end of the body in the width-wise direction. The first rail extends in a movement direction of the second rail and includes a plurality of lock slots. The lock hook is inserted into and removed from a corresponding one of the plurality of lock slots when the lock member pivots. The second rail includes two side walls opposed to each other in the width-wise direction. Each of the two side walls includes an accommodation slot, into which the rotation shaft is inserted, a shaft restriction piece, and a lock hook slot, through which the lock hook is inserted. The shaft restriction piece includes a free end extending from an edge of the accommodation slot in a direction intersecting with the longitudinal direction, wherein the free end contacts the rotation shaft in the longitudinal direction. The lock hook slot extends in a movement direction of the lock hook when the lock member pivots.

BRIEF DESCRIPTION OF THE DRAWINGS

FIGS. 6A and 6B are schematic side views showing operations of the vehicle seat sliding device.

EMBODIMENTS OF THE INVENTION

Figure 1:
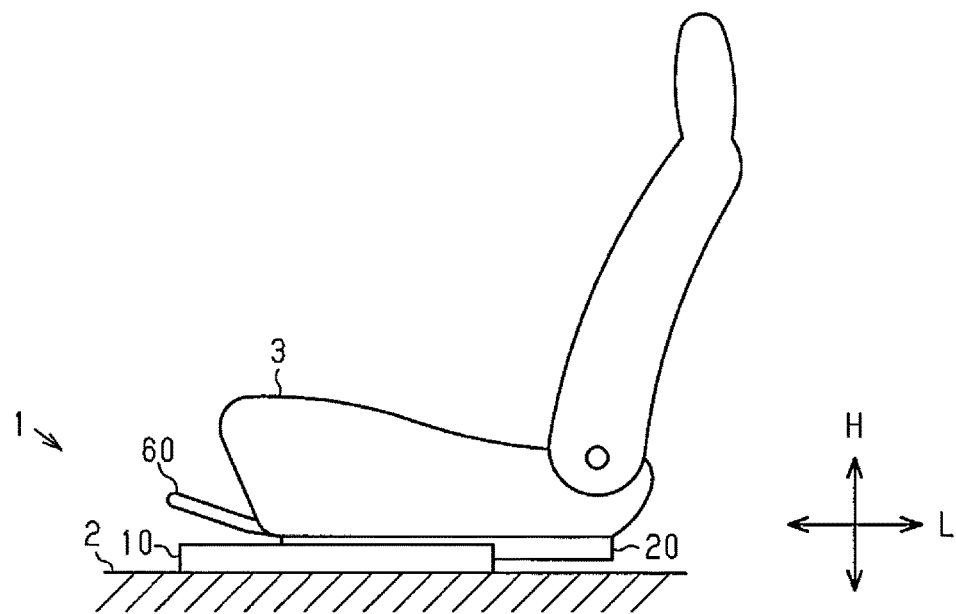
FIG. 1 is a schematic side view of a vehicle seat sliding device.

One embodiment of a vehicle seat sliding device according to the present invention will now be described with reference to FIGS. 1 to 6B.

Elements in the drawings may be partially enlarged for simplicity and clarity and thus have not necessarily been drawn to the actual scale or the scale used in a different drawing. To facilitate understanding, hatching lines of elements may not be shown in the cross-sectional drawings.

As shown in FIG. 1, a vehicle seat sliding device 1 is fixed to a floor 2 of a vehicle to support a vehicle seat 3.

Figure 2:
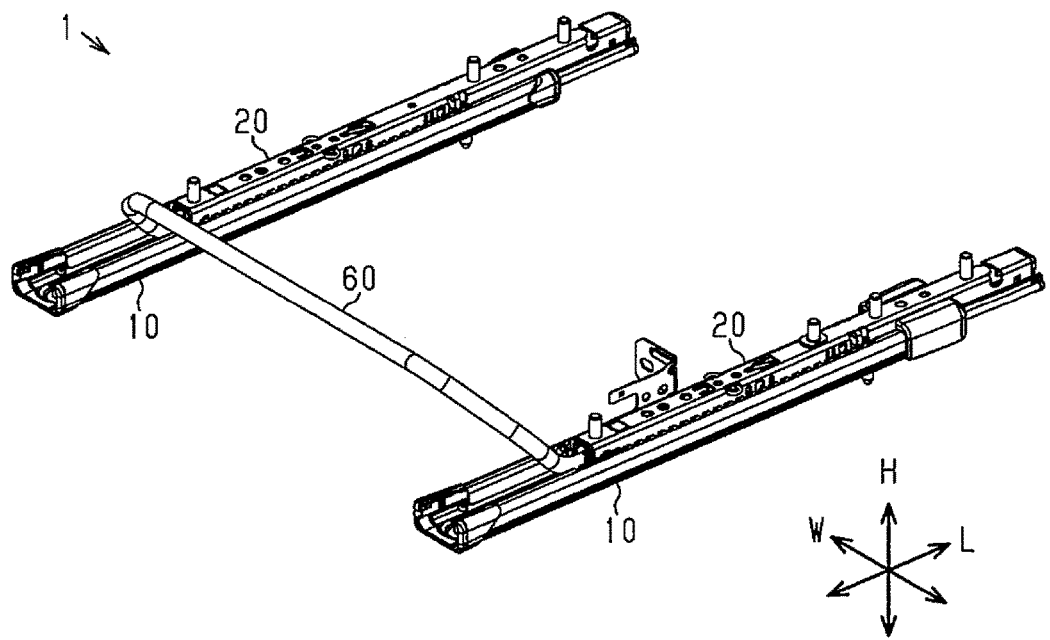
FIG. 2 is a schematic perspective view of the vehicle seat sliding device.

As shown in FIG. 2, the vehicle seat sliding device 1 includes two lower rails 10 and two upper rails 20. As shown in FIG. 1, the lower rails 10 are fixed to the floor 2 of the vehicle. The lower rails 10 extend in the front-rear direction of the vehicle (sideward direction in FIG. 1). The two lower rails 10 are arranged next to each other in the width-wise direction of the vehicle.

As shown in FIG. 2, the two lower rails 10 respectively support the two upper rails 20. The upper rails 20 are coupled to the lower rails 10 to be movable in the longitudinal direction of the lower rails 10 (front-rear direction of vehicle).

The vehicle seat sliding device 1 includes an operation handle 60 (loop handle). As shown in FIG. 1, the operation handle 60 projects frontward from a front end of the vehicle seat 3. The vehicle seat sliding device 1 includes a lock mechanism, which will be described later. The lock mechanism restricts a relative movement of the lower rails 10 and the upper rails 20. The operation handle 60 releases locking (engaged state) of the lock mechanism to allow the relative movement of the lower rails 10 and the upper rails 20.

Figure 3:
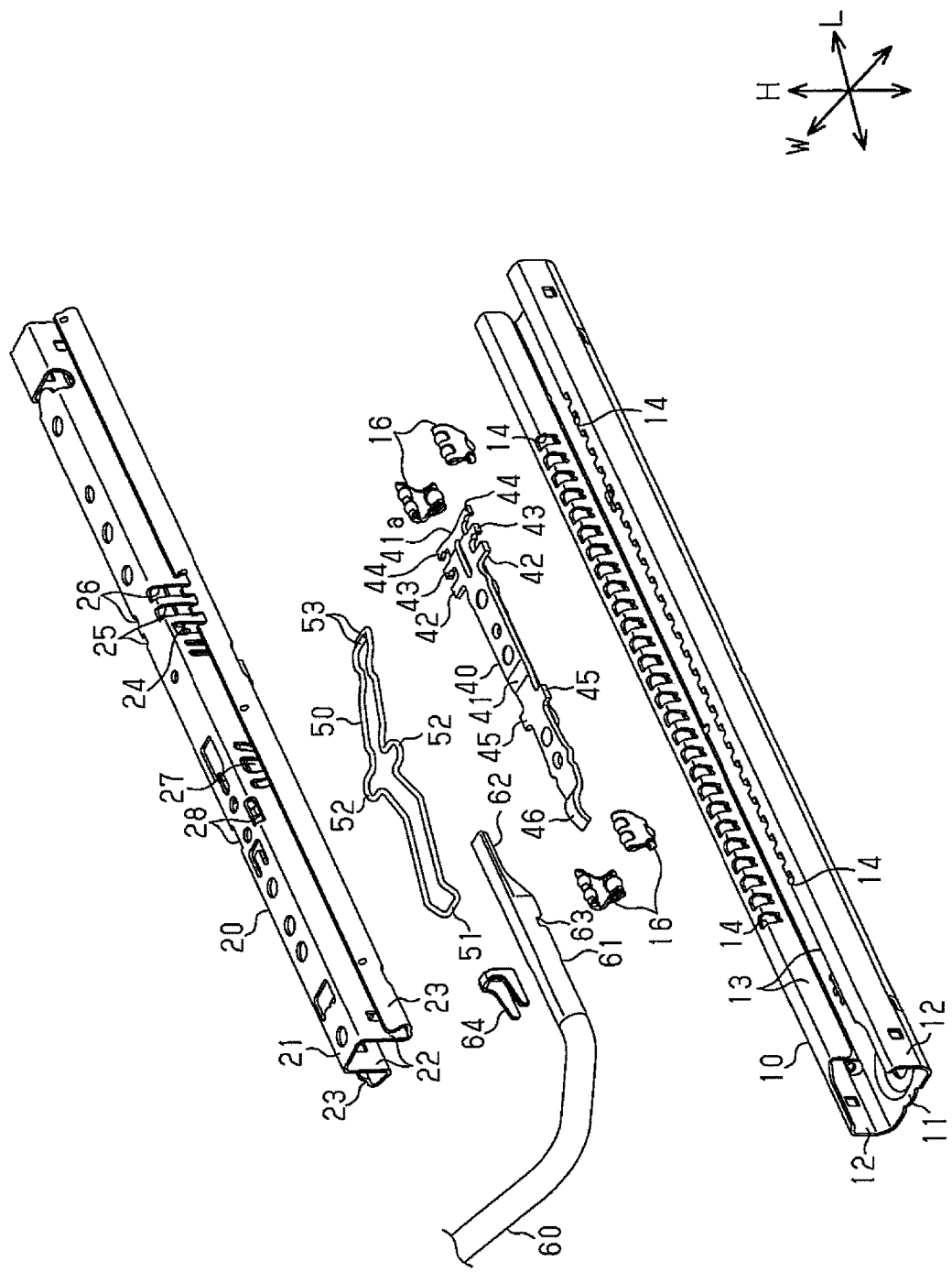
FIG. 3 is an exploded perspective view of the vehicle seat sliding device.

As shown in FIG. 3, each lower rail 10 includes a lower coupling wall 11, two lower side walls 12, and two lower fold walls 13. The lower coupling wall 11 has the form of a rectangular plate and is fixed to the floor 2, which is shown in FIG. 1. The lower side walls 12 are portions that are bent from opposite side edges of the lower coupling wall 11 at a substantially right angle. The lower fold walls 13 are portions that are bent from an end of each lower side wall 12 toward an inner side of the lower rail 10.

The basal end of each lower fold wall 13, that is, the upper end of the lower fold wall 13, includes a plurality of lock slots 14 arranged next to one another in a longitudinal direction L of the lower fold wall 13. Each lock slot 14 is defined by a generally trapezoidal slot that is narrower toward the lower coupling wall 11 as viewed in a width-wise direction W. The lock slots 14 are formed at fixed intervals in the longitudinal direction L and are open toward the upper side. In this description, the vertical direction is referred to as the height-wise direction H and is orthogonal to the width-wise direction W and the longitudinal direction L.

Each upper rail 20 includes an upper coupling wall 21, two upper side walls 22, and two upper fold walls 23. In the same manner as the lower coupling wall 11, the upper coupling wall 21 has the form of a rectangular plate. The upper side walls 22 are portions that are downwardly bent from opposite side edges of the upper coupling wall 21 at a substantially right angle. The upper fold walls 23 are portions that are bent from an end of each upper side wall 22 toward outer sides of the upper rail 20.

When the upper rail 20 is coupled to the lower rail 10, the lower fold walls 13 are arranged between the corresponding ones of the upper side walls 22 and the upper fold walls 23. This state allows the upper rail 20 to move along the lower rail 10. Additionally, in this state, separation and detachment of the upper rail 20 from the lower rail 10 are restricted.

Three lock hook slots 24, 25, 26 are formed in an intermediate portion of the upper rail 20 in the longitudinal direction L and arranged next to one another in the longitudinal direction L of the upper rail 20. The intervals of the lock hook slots 24 to 26 are substantially the same as the intervals of the lock slots 14. The lock hook slots 24 to 26 extend through the upper rail 20 in the width-wise direction W. The lock hook slots 24 to 26 are each defined by a generally rectangular slot extending in the height-wise direction H and slightly curved. The lock hook slots 24 to 26 are formed in a range including each upper side wall 22 and a portion of the upper coupling wall 21.

Additionally, a shaft accommodation slot 27 is formed in each upper side wall 22. The shaft accommodation slots 27 are arranged between the lock hook slots 24 to 26 and the operation handle 60. The shaft accommodation slots 27 extend through the upper side walls 22 in the width-wise direction W.

A spring holding slot 28 is formed in a boundary portion between each upper side wall 22 and the upper coupling wall 21. The spring holding slots 28 are arranged between each shaft accommodation slot 27 and the operation handle 60.

The vehicle seat sliding device 1 includes a plurality of rolling members 16. The rolling members 16 are arranged between each upper fold wall 23 and the lower side wall 12 opposed to the upper fold wall 23. Each rolling member 16 includes a retainer and bearing balls, which are held by the retainer and function as rolling bodies. The upper rail 20 is supported by the lower rail 10 to be movable when the rolling members 16 roll between the upper rail 20 and the lower rail 10.

A lock member 40 extends in the longitudinal direction of the lower rail 10 and is located in a space between the lower rail 10 and the upper rail 20.

Each lock member 40 includes a body 41, two sets of lock hooks 42, 43, 44, and a rotation shaft 45, and an input portion 46, which are integrated together. The lock member 40 is formed by pressing a metal plate.

The body 41 has the form of a generally rectangular plate extending in the longitudinal direction L. The body 41 includes a distal end 41a located at a side opposite to the operation handle 60. The lock hooks 42, 43, 44 are formed on each of two side surfaces of the distal end 41a. Each of the lock hooks 42, 43, 44 has the form of a polygonal rod projecting in the width-wise direction W. The layout intervals of the lock hooks 42, 43, 44 are the same as the layout intervals of the lock slots 14. The input portion 46 is formed on an end of the body 41 opposite to the distal end 41a.

A spring 50 is formed by bending a single wire-like member into the shape of a generally rectangular frame in a plan view. The spring 50 is located in the space between the lower rail 10 and the upper rail 20 at a position above the lock member 40.

The spring 50 includes a connecting portion 51 connecting two wire-like members, which extend in the longitudinal direction L, to each other. The spring 50 further includes holding portions 52 located at a central portion of each wire-like member. Each of the two holding portions 52 outwardly projects to be generally U-shaped. The holding portions 52 are inserted from the inner side of the upper rail 20 through the respective spring holding slots 28. When the holding portions 52 are inserted through the spring holding slots 28, the spring 50 is held in the upper rail 20. The spring 50 illustrated in FIG. 3 shows the state held in the upper rail 20.

The spring 50 further includes urging portions 53 defined by the distal end of each of the two wire-like members. The urging portions 53 are formed by inwardly bending the wire-like members. Each of the urging portions 53 extends at a substantially right angle with respect to the longitudinal direction L of the spring 50. The urging portions 53 are located adjacent to each other in the longitudinal direction L of the spring 50. The urging portions 53 are in contact with the upper surface of the lock member 40. Thus, the spring 50 urges the distal end 41a of the lock member 40 toward the lower rail 10.

As shown in FIG. 2, the operation handle 60 is formed by bending a tubular member. The operation handle 60 extends in the width-wise direction W to bridge the two upper rails 20 at the front of the upper rails 20.

As shown in FIG. 3, the operation handle 60 has two opposite ends, each of which includes a support portion 61 and a pressing portion 62. The support portion 61 has the form of a generally tetragonal tube. The pressing portion 62 is located on the distal end of the support portion 61. The pressing portion 62 is flat. The pressing portion 62 is formed, for example, by squeezing a tetragonal tubular member, which serves as the support portion 61.

A slit-like support groove 63, which extends in the width-wise direction W, is formed in the lower surface of the support portion 61. A bracket 64 is fixed to the support portion 61. The bracket 64 is U-shaped and is open toward the lower side. The bracket 64 is fixed to the upper surface and two side surfaces of the support portion 61. The bracket 64 forms a projection on the upper surface of the support portion 61.

Figure 4:
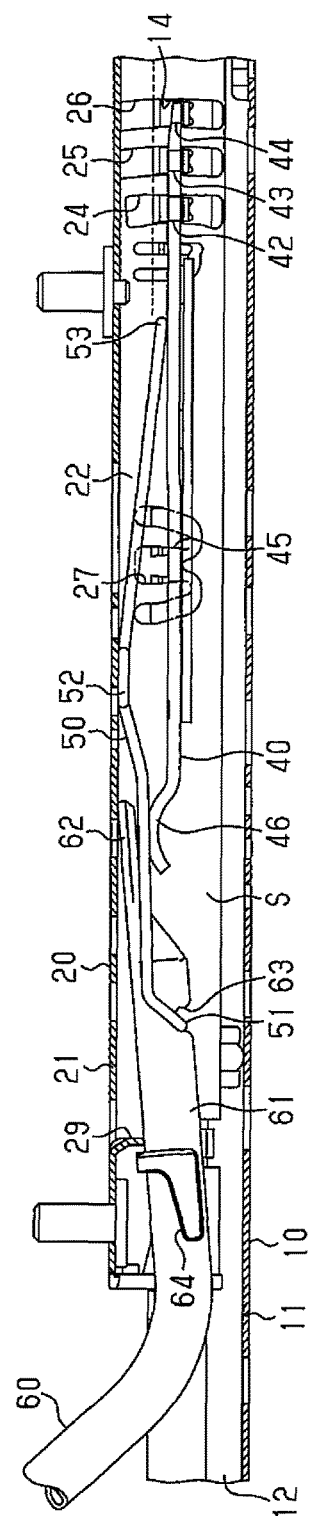
FIG. 4 is a partially cross-sectional side view of the vehicle seat sliding device.

As shown in FIG. 4, the support portion 61 and the pressing portion 62 are inserted into a space S between the lower rail 10 and the upper rail 20. The upper rail 20 has a front end portion, which includes a handle support piece 29 downwardly projecting from the upper coupling wall 21 toward the space S. The handle support piece 29 is formed by cutting and bending a portion of the upper coupling wall 21.

The support portion 61 is located in the space S between the upper rail 20 and the lower rail 10. The connecting portion 51 of the spring 50 is inserted into the support groove 63 of the support portion 61. The connecting portion 51 is inserted into the support groove 63 and engaged with the support portion 61. Thus, the connecting portion 51 hooks the operation handle 60 to prohibit the removal of the operation handle 60. The bracket 64 is located at the front of the handle support piece 29.

The spring 50 urges the pressing portion 62 toward the upper coupling wall 21. The urging brings the upper surface of the support portion 61 into contact with the distal end of the handle support piece 29 from the lower side. Also, the distal end of the pressing portion 62 contacts the lower surface of the upper coupling wall 21 from the lower side.

The pressing portion 62 is located above the input portion 46 of the lock member 40, that is, between the input portion 46 and the upper coupling wall 21. The pressing portion 62 is arranged so that a gap is maintained between the pressing portion 62 and the upper surface of the input portion 46 of the lock member 40.

The lock member 40 is located in the space S between the lower rail 10 and the upper rail 20. The rotation shaft 45 is inserted into the shaft accommodation slots 27 of the upper rail 20. When the rotation shaft 45 is inserted into the shaft accommodation slots 27, the lock member 40 is pivotally supported by the upper rail 20.

The lock hooks 42, 43, 44 of the lock member 40 are respectively inserted through the lock hook slots 24 to 26 of the upper rail 20. Each of the lock hook slots 24 to 26 is arcuate in conformance with the lock hooks 42, 43, 44, which move when the lock member 40 pivots. The lock hooks 42, 43, 44 are inserted into or removed from the lock slots 14 of the lower rail 10 in accordance with the pivoting of the lock member 40.

Figure 5:
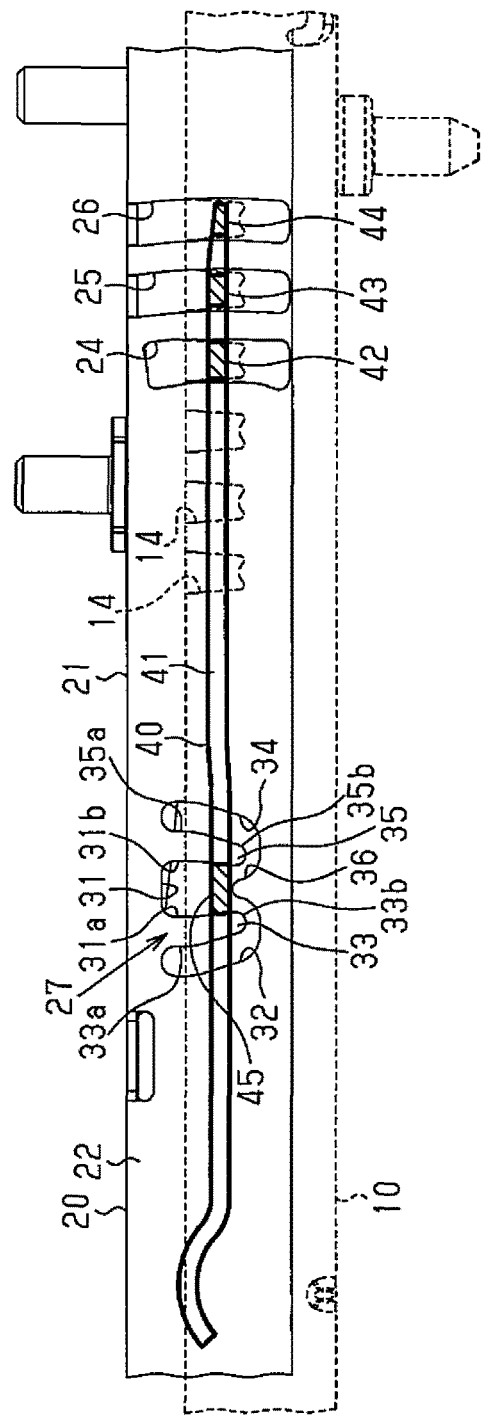
FIG. 5 is a partially side view of the vehicle seat sliding device.

As shown in FIG. 5, each shaft accommodation slot 27 includes a shaft insertion slot 31, into which the rotation shaft 45 of the lock member 40 is inserted. The shaft insertion slot 31 is defined by a generally rectangular hole extending in the height-wise direction H. In the present embodiment, the shaft insertion slot 31 is defined by a generally trapezoidal hole that is narrower toward the lower side. Thus, the width of the shaft insertion slot 31 is reduced at positions further from the upper coupling wall 21. More specifically, the distance between two side surfaces 31a, 31b, defining the shaft accommodation slot 27, is shorter toward the lower side, that is, at positions further from the upper coupling wall 21.

Additionally, the shaft accommodation slot 27 includes a slit 32 extending frontward from a lower left end of the shaft insertion slot 31. The slit 32 extends toward the upper surface of the upper rail 20 along the side surface 31a of the shaft insertion slot 31. A shaft restriction piece 33 is formed between the shaft insertion slot 31 and the slit 32. The shaft restriction piece 33 includes a basal end 33a connected to the upper side wall 22. The shaft restriction piece 33 is a cantilever downwardly extending from an upper portion of the upper side wall 22. The shaft restriction piece 33 includes a distal end 33b contacting a left side surface, or a front surface, of the rotation shaft 45.

The shaft accommodation slot 27 also includes a slit 34 extending rearward from a lower right end of the shaft insertion slot 31. The slit 34 extends toward the upper surface of the upper rail 20 along the side surface 31b of the shaft insertion slot 31. A shaft restriction piece 35 is formed between the shaft insertion slot 31 and the slit 34. The shaft restriction piece 35 includes a basal end 35a connected to the upper side wall 22. The shaft restriction piece 35 is a cantilever downwardly extending from an upper portion of the upper side wall 22. The shaft restriction piece 35 includes a distal end 35b contacting a right side surface, or a rear surface, of the rotation shaft 45.

More specifically, the upper side wall 22 includes the shaft restriction piece 33 at the front of the rotation shaft 45 and the shaft restriction piece 35 at the rear of the rotation shaft 45. The shaft restriction pieces 33, 35 respectively include the distal ends 33b, 35b extending from an upper edge of the shaft accommodation slot 27 in a direction intersecting with the longitudinal direction L. The distal ends 33b, 35b are free ends of the shaft restriction pieces 33, 35, respectively, and are in contact with the rotation shaft 45.

Additionally, the upper side wall 22 includes a projection 36 projecting from a lower end of the shaft insertion slot 31, that is, a lower edge of the shaft accommodation slot 27, in the height-wise direction H. The projection 36 restricts a downward movement of the rotation shaft 45. The dimension of the rotation shaft 45 in the longitudinal direction L varies depending on a manufacturing process. For example, variations in the manufacturing process may cause the dimension of the rotation shaft 45 to be less than the distance between the two distal ends 33b, 35b of the shaft restriction pieces 33, 35. In this case, the rotation shaft 45 will be located at a lower position than a predetermined position and fail to engage with the shaft restriction pieces 33, 35. In this regard, if the dimension of the rotation shaft 45 is set to a value that is sufficiently greater than the distance between the distal ends 33b, 35b of the shaft restriction pieces 33, 35, the projection 36 may be omitted.

The operation of the above vehicle seat sliding device 1 will now be described.

As shown in FIG. 4, the support portion 61 and the pressing portion 62 of the operation handle 60 are located in the space S between the lower rail 10 and the upper rail 20. The connecting portion 51 of the spring 50 is inserted into the support groove 63 of the support portion 61. The engagement of the connecting portion 51 with the support portion 61 hooks the operation handle 60 to prohibit removal of the operation handle 60.

The spring 50 urges the support portion 61 and the pressing portion 62 in the height-wise direction H, that is, toward the upper coupling wall 21. This brings the distal end of the handle support piece 29 into contact with the upper surface of the support portion 61, that is, a portion between the bracket 64 (projection) and the distal end of the support portion 61. The pressing portion 62 contacts the lower surface of the upper coupling wall 21.

When the front end of the operation handle 60, shown in FIG. 1, is operated upward, as shown in FIG. 4, the operation handle 60 pivots about the distal end of the handle support piece 29 in the clockwise direction of FIG. 4. The pressing portion 62 of the operation handle 60 downwardly presses the input portion 46 of the lock member 40. This pivots the lock member 40 in the counterclockwise direction of FIG. 4. Consequently, the lock hooks 42, 43, 44 are disengaged from the lock slots 14, allowing the upper rail 20 to move relative to the lower rail 10.

The operation handle 60 is hooked by the spring 50 so that the operation handle 60 cannot be removed. With this structure, if the operation handle 60 receives force that is greater than the elastic force of the spring 50, the connecting portion 51 may be disengaged from the support groove 63. The upper surface of the support portion 61 includes the projection formed by the bracket 64. The projection of the bracket 64 engages with the handle support piece 29 to restrict movement of the support portion 61. Thus, a rearward movement of the operation handle 60 is restricted.

As shown in FIG. 5, the shaft accommodation slot 27 includes the shaft insertion slot 31, into which the rotation shaft 45 of the lock member 40 is inserted. The shaft accommodation slot 27 also includes the slits 32, 34 extending from the lower end of the shaft insertion slot 31 toward the upper coupling wall 21 along the side surfaces 31a, 31b of the shaft insertion slot 31. Additionally, the shaft restriction pieces 33, 35 are formed on the upper side walls 22 of the upper rail 20 by the shaft accommodation slot 27. The shaft restriction pieces 33, 35 each include the distal end contacting the side surface of the rotation shaft 45 in the longitudinal direction L. The shaft restriction pieces 33, 35 are cantilevers. The shaft restriction pieces 33, 35 will be bent by a load applied to the upper rail 20 to allow relative movement of the upper rail 20 and the lock member 40.

As shown in FIG. 6A, when a load is applied to the upper rail 20 in a direction indicted by arrow A1, the upper rail 20 moves in the arrow A1 direction. In this case, the lock hook 42 engages a side surface 14a of the lock slot 14 to restrict movement of the lock member 40. Thus, the upper rail 20 moves relative to the lock member 40 in the arrow A1 direction as the upper rail 20 bends the shaft restriction piece 35. Consequently, the lock hook 42 is sandwiched between the side surface 14a of the lock slot 14 and a side surface 24b of the lock hook slot 24. That is, the lock hook 42 is held by the lower rail 10 and the upper rail 20. This restricts movement of the lock hook 42 in the vertical direction. Thus, changes in the position of the lock member 40 are limited when a load is applied to the upper rail 20.

As shown in FIG. 6B, when a load is applied to the upper rail 20 in a direction indicated by arrow A2, the upper rail 20 moves in the arrow A2 direction. In this case, the lock hook 42 engages with the side surface 14b of the lock slot 14 to restrict movement of the lock member 40. Thus, the upper rail 20 moves relative to the lock member 40 in the arrow A2 direction as the upper rail 20 bends the shaft restriction piece 33. Consequently, the lock hook 42 is sandwiched between the side surface 14b of the lock slot 14 and the side surface 24a of the lock hook slot 24. That is, the lock hook 42 is held by the lower rail 10 and the upper rail 20. This restricts movement of the lock hook 42 in the vertical direction. Thus, changes in the position of the lock member 40 are limited when a load is applied to the upper rail 20.

As described above, the present embodiment has the following advantages.

(1) Each shaft accommodation slot 27 includes the shaft insertion slot 31, into which the rotation shaft 45 of the lock member 40 is inserted. The shaft accommodation slot 27 also includes the slits 32, 34 extending from the lower end of the shaft insertion slot 31 toward the upper coupling wall 21 along the side surfaces 31a, 31b of the shaft insertion slot 31. The shaft restriction pieces 33, 35 are formed on each upper side wall 22 of the upper rail 20 by the shaft accommodation slots 27. The shaft restriction pieces 33, 35 each include the distal end contacting the side surface of the rotation shaft 45 in the longitudinal direction L.

When a load is applied to the upper rail 20, the upper rail 20 moves. In this case, the lock hook 42 engages with one of the side surfaces 14a, 14b of the lock slot 14 in accordance with a movement direction of the upper rail 20 to restrict movement of the lock member 40. Thus, the upper rail 20 moves relative to the lock member 40 as the upper rail 20 bends one of the shaft restriction pieces 33, 35. At this time, the lock hook 42 is sandwiched between the side surface 14a of the lock slot 14 and the side surface 24b of the lock hook slot 24 or between the side surface 14b of the lock slot 14 and a side surface 24a of the lock hook slot 24. That is, the lock hook 42 is held by the lower rail 10 and the upper rail 20. This restricts movement of the lock hook 42 in the vertical direction. More specifically, changes in the position of the lock member 40 are limited when a load is applied to the upper rail 20. Therefore, the position of the lock member 40 is stabilized.

(2) Each upper side wall 22 of the upper rail 20 includes the shaft restriction pieces 33, 35 at opposite sides of the shaft insertion slot 31 in the longitudinal direction L. Thus, when the upper rail 20 is moved in the longitudinal direction L, the shaft restriction pieces 33, 35 are bent to restrict movement of the lock hook 42 of the lock member 40.

(3) The shaft restriction pieces 33, 35 include the basal ends 33a, 35a, which are located in the proximity of the upper coupling wall 21, and extend in the height-wise direction H, which is orthogonal to the longitudinal direction L. Such shapes allow the shaft restriction pieces 33, 35 to easily bend when the upper rail 20 moves in the longitudinal direction L. Thus, the movement of the lock hook 42 of the lock member 40 is restricted at an early stage where a load starts to be applied to the upper rail 20.

(4) Each shaft accommodation slot 27 includes the projection 36 projecting from the lower end of the shaft insertion slot 31 in the height-wise direction H. The projection 36 restricts a downward movement of the rotation shaft 45. The dimension of the rotation shaft 45 in the longitudinal direction L may vary depending on the manufacturing process. For example, variations in the manufacturing process may cause the dimension of the rotation shaft 45 to be less than the distance between the distal ends 33b, 35b of the shaft restriction pieces 33, 35. In this case, the rotation shaft 45 will be located at a lower position than the predetermined position and fail to engage with the shaft restriction pieces 33, 35. In the present embodiment, the projection 36 allows the distal ends 33b, 35b of the shaft restriction pieces 33, 35 to be in contact with the rotation shaft 45 and allows for bending of the shaft restriction pieces 33, 35. Thus, movement of the lock hook 42 of the lock member 40 is restricted.

The above embodiment may be modified as follows.

The shape of the shaft insertion slot 31 of the embodiment may be changed as follows.

Figure 7A:
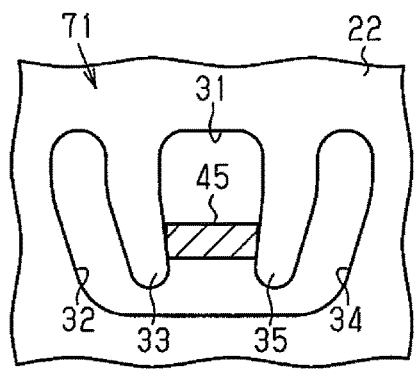
FIGS. 7A to 7D are partially side views of upper side walls showing other shaft accommodation slots.
Figure 7B:
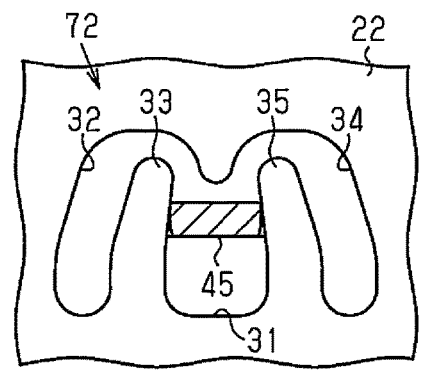

As shown in FIG. 7A, the shape may be changed to that of a shaft accommodation slot 71, from which the projection 36 shown in FIG. 5 is omitted. As shown in FIG. 7B, the shape may be changed to that of a shaft accommodation slot 72 in which the upper and lower sides are inverted with respect to the upper side wall 22.

Figure 7C:
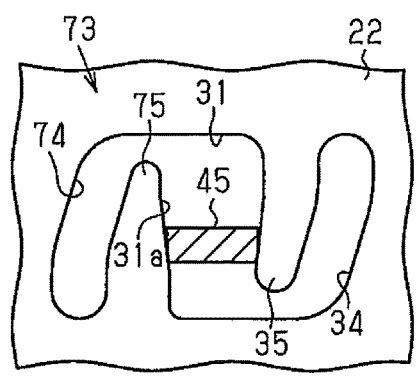

The shape may be changed to that of a shaft accommodation slot 73 shown in FIG. 7C. In this case, the shaft accommodation slot 73 includes a slit 74 extending from an upper front end of the shaft insertion slot 31 along the side surface 31a. The upper side wall 22 includes a shaft restriction piece 75 formed by the shaft accommodation slot 73 and the slit 74 and upwardly extending. The shaft restriction piece 75 also has the same advantages as the above embodiment.

Figure 7D:
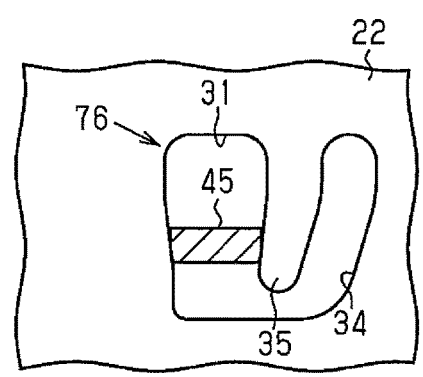

The shape may be changed to that of a shaft accommodation slot 76 shown in FIG. 7D. In this case, the upper side wall 22 may include the shaft restriction piece 35 located at only one of the left and right side surfaces of the shaft accommodation slot 76.

In the above embodiment, the fixing relationship of the lower rail 10 and the upper rail 20 may be inverted upside down with respect to the floor 2 of the vehicle and the vehicle seat 3.

In the above embodiment, an urging member urging the lock member 40 may be provided separately from a member holding the support portion 61 and the pressing portion 62 of the operation handle 60.

The invention claimed is:
1. A vehicle seat sliding device comprising:
a first rail;
a second rail coupled to the first rail to be movable in a longitudinal direction of the first rail; and
a lock member pivotally arranged in the second rail, wherein the lock member includes a body, a rotation shaft extending from the body in a width-wise direction, which is orthogonal to the longitudinal direction, and at least one lock hook extending from a distal end of the body in the width-wise direction, the first rail extends in a movement direction of the second rail and includes a plurality of lock slots, wherein the at least one lock hook is inserted into and removed from a corresponding one of the plurality of lock slots when the lock member pivots, the second rail includes two side walls opposed to each other in the width-wise direction, the rotation shaft and the body are integrated together, each of the two side walls includes an accommodation slot, into which the rotation shaft is inserted, a pair of shaft restriction pieces, and at least one lock hook slot, through which a respective at least one lock hook is inserted, each of the shaft restriction pieces includes a first end extending from an edge of the accommodation slot in a height-wise direction so that the shaft restriction pieces are located at opposite sides of the rotation shaft in the longitudinal direction, wherein each first end contacts a respective side of the rotation shaft in the longitudinal direction, the shaft restriction pieces are located at opposite sides of the rotation shaft in the longitudinal direction, the at least one lock hook slot extends in a movement direction of the at least one lock hook when the lock member pivots, the second rail includes a coupling portion coupling the two side walls, and each of the two side walls includes a projection projecting toward the coupling portion from a lower edge of the accommodation slot in the height-wise direction and the projection is configured to be able to come in contact with a lower surface of the rotation shaft, the projection portion includes an upper convex portion that contacts the shaft.

2. The vehicle seat sliding device according to claim 1, wherein each shaft restriction piece extends from an upper edge of the accommodation slot in the height-wise direction.

* * * * *